US006968469B1

(12) United States Patent
Fleischmann et al.

(10) Patent No.: US 6,968,469 B1
(45) Date of Patent: Nov. 22, 2005

(54) SYSTEM AND METHOD FOR PRESERVING INTERNAL PROCESSOR CONTEXT WHEN THE PROCESSOR IS POWERED DOWN AND RESTORING THE INTERNAL PROCESSOR CONTEXT WHEN PROCESSOR IS RESTORED

(75) Inventors: Marc Fleischmann, Menlo Park, CA (US); H. Peter Anvin, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 331 days.

(21) Appl. No.: 09/595,198

(22) Filed: Jun. 16, 2000

(51) Int. Cl.[7] .............................................. G06F 1/32
(52) U.S. Cl. ...................... 713/324; 713/300; 712/228; 365/228; 365/229
(58) Field of Search ................ 713/300, 320, 713/324, 323, 340; 711/100, 130; 703/26; 365/228, 229; 714/15, 22, 24; 712/228

(56) References Cited

U.S. PATENT DOCUMENTS

| | | | | |
|---|---|---|---|---|
| 4,523,206 A | * | 6/1985 | Sasscer ........................ | 711/130 |
| 4,763,333 A | * | 8/1988 | Byrd ........................... | 714/22 |
| 5,204,963 A | * | 4/1993 | Noya et al. .................. | 365/229 |
| 5,617,572 A | * | 4/1997 | Pearce et al. ............... | 713/323 |
| 5,671,229 A | * | 9/1997 | Harari et al. ................ | 714/710 |
| 5,765,001 A | * | 6/1998 | Clark et al. .................. | 713/340 |
| 5,864,659 A | * | 1/1999 | Kini ............................. | 714/31 |
| 5,878,264 A | * | 3/1999 | Ebrahim ...................... | 713/323 |
| 5,898,880 A | * | 4/1999 | Ryu ............................. | 713/323 |
| 5,935,259 A | * | 8/1999 | Anderson .................... | 713/340 |
| 5,991,531 A | * | 11/1999 | Song et al. .................... | 703/26 |
| 6,035,407 A | * | 3/2000 | Gebara et al. .............. | 713/300 |
| 6,182,231 B1 | * | 1/2001 | Gilgen ......................... | 713/324 |
| 6,266,776 B1 | * | 7/2001 | Sakai .......................... | 713/300 |
| 6,397,242 B1 | * | 5/2002 | Devine et al. ................. | 709/1 |
| 6,405,320 B1 | * | 6/2002 | Lee et al. .................... | 713/300 |
| 6,484,274 B1 | * | 11/2002 | Lee et al. ..................... | 714/38 |

OTHER PUBLICATIONS

Tanenbaum, Andrew; 1984, "Structured Computer Organization", Prentice-Hall inc., 2nd Ed., p. 11.*

* cited by examiner

*Primary Examiner*—Thomas Lee
*Assistant Examiner*—Mark Connolly
(74) *Attorney, Agent, or Firm*—Wagner, Murabito & Hao LLP

(57) ABSTRACT

A CPU (1) automatically preserves the CPU context in a computer memory (5) that remains powered-up when the CPU is powered down in sleep mode. By means of the preserved CPU context, the CPU is able to instantly and transparently resume program execution at the instruction of the program that was asserted for execution when the CPU was powered down. The CPU is permitted to power down frequently, even during execution of a program, and results in reduced average overall power consumption.

14 Claims, 2 Drawing Sheets

SYSTEM AND METHOD FOR PRESERVING INTERNAL PROCESSOR CONTEXT WHEN THE PROCESSOR IS POWERED DOWN AND RESTORING THE INTERNAL PROCESSOR CONTEXT WHEN PROCESSOR IS RESTORED

FIELD OF THE INVENTION

This invention relates to sleep modes for digital computers and, more particularly, to a novel method and apparatus for reducing battery power drain in portable computers during periods in which the computer is left idle for a time, even momentarily, while restoring CPU operation instantaneously once processing is to resume.

BACKGROUND

Portable digital computers rely on rechargeable DC batteries to provide the electrical power necessary for operation. When the computer is powered on for processing operation, but allowed to remain idle, the battery continues nonetheless to supply current to all the components of the computer, including the central processing unit (CPU), memory, the chipset (e.g. the Southbridge) and the display of the computer. If the user fails to turn off the computer, the battery continues to supply full current and, eventually, becomes drained of the stored electrical power. The foregoing action leads to more frequent recharging of the battery, and reduces the utility and usability of the computer system.

To reduce battery drain under such circumstances, a power management technique was previously introduced for portable computers, called the "sleep" mode. Typically, portable computers based on the INTEL X86 CPU and associated chip set, referred to as "PC's", include multiple sleep modes (e.g. states of sleep mode). The multiple sleep modes enable the portable computer, when left idle, to selectively power down the components and devices of the computer in stages, although the main power remains on. With the computer spending an increasing amount of time idling, the computer progresses through increasingly deeper and deeper stages of sleep mode (and hence, greater reductions in power consumption). One of the deepest of those modes is characterized by all of the devices, including the CPU, but excepting the main memory (RAM) and the Southbridge chip, being powered down. This latter mode is typically referred to as "Suspend to RAM" ("STR") or as "Power-on-Suspend" ("POS") or like terms. In the STR condition power consumption is dramatically reduced and offers the greatest power reduction short of that power reduction obtained by turning off every component of the computer, the latter being referred to as "suspend to disk", essentially completely shutting down the computer.

The sleep modes in the PC are defined and controlled by the operating system software, such as familiar Windows 9X, Unix, Linux and the like, in conjunction with the system BIOS of the computer. When in STR, the Southbridge portion of the chip set, which is responsible for power management of the PC, continues to monitor the keyboard and mouse (and/or resume key) of the PC for any user activity, signifying an end to the computer idle condition.

When the user later returns to perform computing and observes the computer is in a sleep mode, the user operates a "resume" key (or any key of the keyboard) or the like. That action initiates a chain of events in the computer, transparent to the user, that restores full power to the CPU; and the computer recovers quickly. Return from the upper stages of the sleep mode recovers more quickly than recovery from the STR stage, the deepest stage after the Suspend to Disk stage, the latter recovery procedure being referred to as a "resume from STR".

Of particular convenience, the user may immediately resume computing at the precise location in any application program that was active in the computer at the time the computer entered the sleep mode. To reach that point from the STR stage of sleep mode, the CPU processes a number of steps of the "boot-up" routine for the computer; steps that typically occur in a manner transparent to the user. The computer is able to resume where it left off, because, prior to entering STR, the computer preserved the complete state of all software applications and of all components and devices, including the CPU, in a memory that remained powered up during the "sleep".

For the power management technique of sleep mode, the CPU and the external memory (DRAM) are independently supplied with power, that is, are located in separate power domains. In the deepest sleep mode, STR, power is removed from the CPU (and other electronic components of the computer, such as the display), while maintaining the DRAM memory and the Southbridge chip under power. The application programs and the state of those application programs (e.g. the CPU "context") is preserved by transferring the state information to the DRAM.

In processing operation, the CPU executes application programs by continuously modifying both its internal state and memory contents according to the instructions of the program. The internal CPU memory of the X86 system resides in the same power domain as the CPU. Thus, whenever the CPU is powered down, such as for an STR procedure, the internal memory is also powered down, and normally results in the loss of that CPU context. In order for the CPU of the X86 system to resume processing of an application program on Resume from STR, the processor must at that time at least "know" the state of the program on entering STR. Before entering STR, the CPU executes an instruction (of the power management software) that saves the CPU context at a well defined location in external memory, such as the DRAM memory. That context information subsumes the state of the operating system and the state of the application program. By maintaining power to the DRAM during STR, the state information of the program is preserved, and is available for use later upon a Resume from STR.

Once the resume button is pressed and is detected by the Southbridge chip, power is reapplied to the CPU, which commences its start-up routines. The CPU processes the normal boot-up routine stored in the ROM of the BIOS chip. That boot up procedure initializes the internal registers of the CPU and flushes its caches, thereby establishing a baseline state for the CPU. The process takes a noticeable time in which to complete. However, prior to loading the operating system, such as Windows 9X, the routine checks to determine if the boot-up procedure is a "power up reset" as occurs upon initially powering up the computer, or instead is a Resume from STR. When the routine detects the latter condition, the computer "knows" that the state of the operating system software, any application program, and the corresponding CPU context already resides in the external memory (DRAM). The CPU then completes the boot-up procedure by restoring the device states, and, with a special instruction, finally restores the CPU context from the external memory. Thereafter, the CPU is able to simply proceed with executing the next application program instruction exactly where the CPU left off when entering STR.

In a stage of sleep mode that lies one stage above the STR stage, the penultimate stage (e.g. the pre-STR stage) referred to as "deep sleep", existing operating systems issue an instruction to remove the system clock from the CPU, but to maintain the CPU powered up, continuing to consume battery power. The removal of the system clock reduces power consumption also, but that is not as great a reduction as when power is removed from the CPU, such as during STR. Without clock signals being applied, the CPU is no longer able to process (as would consume additional current), but maintains system context in the associated internal registers of the CPU. That context is not lost and is not required to be saved to external memory as is the case in entering the STR stage. As an advantage, the invention powers down the CPU in all sleep modes and preserves the CPU context, saving additional power.

Accordingly, an object of the invention is to reduce the power consumption of a computer during periods in which the computer is idle, providing a more effective sleep mode.

Another object of the invention is to promote the pre-STR stage of sleep mode in existing power management systems to the STR stage, creating an "Instant STR", and reduce the time required by the computer system to return from that stage, ideally providing a Resume from STR that appears instantaneous.

And, a related object of the invention is to replace on-the-fly a CPU context maintaining sleep mode of existing computer systems that is governed by the operating system with a substitute sleep mode that affords a lower power consumption and remains transparent to the software.

SUMMARY OF THE INVENTION

In accordance with the foregoing objects and advantages, the present invention provides for saving the internal context of the CPU (which includes the state of the application software) and powering down the CPU not only for an STR condition but for any pre-STR stage of sleep mode, and for restoring the state, including such internal context, on the Resume from STR condition, whereby the processor system is quickly restored for operation ready to execute the next instruction of the application program. With the invention, any stage of sleep mode can be promoted to an STR condition to completely power down the CPU in a manner that is transparent to the operating system.

When applied to directly to existing X86 applications and operating systems, the present invention intercepts (or converts) an instruction that calls for an X86 type computer system to enter a CPU context-maintaining sleep mode, a pre-STR stage of sleep mode, and "promotes" or converts that instruction into an instruction to enter the STR stage, and thereafter perform all of the actions described for entering STR. Whereas the X86 operating system of the CPU may "think" that the context of the application program has been saved in one way, the present system actually saves that program context and the CPU context in a different manner, transparent to the X86 operating system. When Resuming from STR, the context is restored, and the X86 operating system is none the wiser.

In accordance with a more specific aspect, the present invention provides a private memory within the processor system, a memory external to the CPU, that is accessible only to the CPU and is powered independently of the CPU to store the CPU context when the CPU is powered down in a sleep mode. The private memory may constitute a logical portion of the external memory, DRAM, in the X86 system, or may be physically separate therefrom or may constitute a logical partition of the CPU internal memory, such as a cache or subset of such cache. Like the existing DRAM, a key characteristic of the foregoing memory is that such memory is independently powered from the CPU core. In the Transmeta processing system, hereafter noted, that memory may be commandeered to serve as private memory for code morphing software (e.g. "CMS memory"). The power down routine for sleep mode includes reading the internal CPU context from the internal memory of the CPU, caches and registers, and writing that context within the private memory. When powered up, either initially or on return from STR, the processor determines whether to perform a normal power up operation, called a power on reset, or a context-restoring operation.

On entering into the Instant STR condition, before concomitant powering down of the CPU of the computer, the CPU preserves the entire CPU context in the independently powered private external memory of the CPU. So long as the private memory remains powered up, the CPU context is preserved despite the fact that the CPU is powered down. Upon Resume from Instant STR to resume processing, power is restored to the CPU. During the boot-up process, the CPU detects that the condition is a resume from Instant STR and, in response, restores its entire internal state from the preserved CPU context located in the private memory. Thereafter the CPU may perform an internal resume to the instruction of the application program that follows the last completed instruction of that program.

As an advantage, the CPU is able to automatically and transparently recover from a sleep mode that powers down the CPU and continue execution of any arbitrary computer program after lapses of arbitrary duration in the sleep mode without any assistance being required of the operating system, BIOS or the like.

The present invention is particularly adaptable to incorporation within and enhances a newly disclosed processor system that is found to already contain a private memory that is powered separately from the processor, but is used to store, among other things, only a part of the internal context of the CPU. That processor system is the very long instruction word (VLIW) processor described, for one, in U.S. Pat. No. 6,031,992, granted Feb. 29, 2000, entitled Combining Hardware and Software to provide an Improved Microprocessor, assigned to Transmeta Corporation, (referred to as the 992 Transmeta patent), which is incorporated herein by reference.

The processor of the 992 Transmeta patent is formed by a combination of a hardware processing portion (called a "morph host"), and an emulating software portion, referred to therein as code morphing software. Among other things, the code morphing software carries out a significant portion of the functions of processors in software, reducing the hardware required for processing and the greater electrical power that such hardware requires. The Transmeta processor serves as the host processor system capable of executing software programs (the "target application") designed with an instruction set intended to run on a processor system of different design, the target processor, one that contains an instruction set unique to the target processor, but foreign to the host system, such as the X86 type processor.

That processor translates instructions that comprise a target software program "on-the-fly" into instructions of the host instruction set (the host instructions); and then executes the latter instructions. In so doing, the morph host processor executes the code morphing software which, functioning as either a software "interpreter" or "translator" of target application programs into host processor instructions, which are able to accomplish the purpose of the original application software. For translation, the code morphing software defines a translator, which converts the target instructions to host instructions, and a translation process that translates the target application programs dynamically and optimizes the latter host instructions to provide an optimized translation.

The foregoing Transmeta processing system, hereafter referred to as the Transmeta processor, necessarily keeps track of its state or CPU context during processing operation. It is found that the Transmeta processor places a considerable portion of its CPU context on memory external of the CPU, such as DRAM. Conceptually, that external memory is herein referred to as "private" CPU memory, because that memory is not visible to (and cannot be accessed by) external application programs; and only the code morphing software of the CPU is able to access the private memory. Further the CPU private memory resides in a different power domain than the CPU, and, therefore, may be powered up or down independently of the CPU. Consequently, the private memory is able to maintain a portion of the internal state of the CPU when the CPU is powered down.

Other portions of the CPU context are saved in memory (caches) internal to the CPU, apart from the private memory. Normally that portion of the CPU context (information) would disappear whenever the Transmeta processor is powered down. In accordance with the present invention, the entire CPU context of the Transmeta processor is stored in the private memory in the Instant STR process. Accordingly, a further object of the invention is to provide a portable computer constructed in accordance with the Transmeta processing system with an improved power saving sleep mode.

When powered up, either initially or on return from Instant STR, the processor determines whether it is to perform a normal power up operation (a power on reset) or a context-restoring operation. Traditional processors typically employ external circuitry to make that decision. The Transmeta processor deposits the corresponding persistent information in the private memory. The presence of that information in the private memory is called an "STR signature".

As an advantage, the Transmeta CPU is able to automatically and transparently recover from a sleep mode in which the CPU is powered down and continue execution of any arbitrary application program, including target applications, after time lapses of arbitrary duration in the sleep mode without any assistance required of the application program. Upon resume from such a sleep mode, the Transmeta processor is able to continue with execution of a target application program. The Transmeta processor is capable of suspending arbitrary X86 computer programs to private memory (e.g. CMS memory) and automatically and transparently resume executing the next instruction of the program without any assistance of the target application.

The foregoing and additional objects and advantages of the invention together with the structure characteristic thereof, which was only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE PREFERRED EMBODIMENTS

Figure 1:
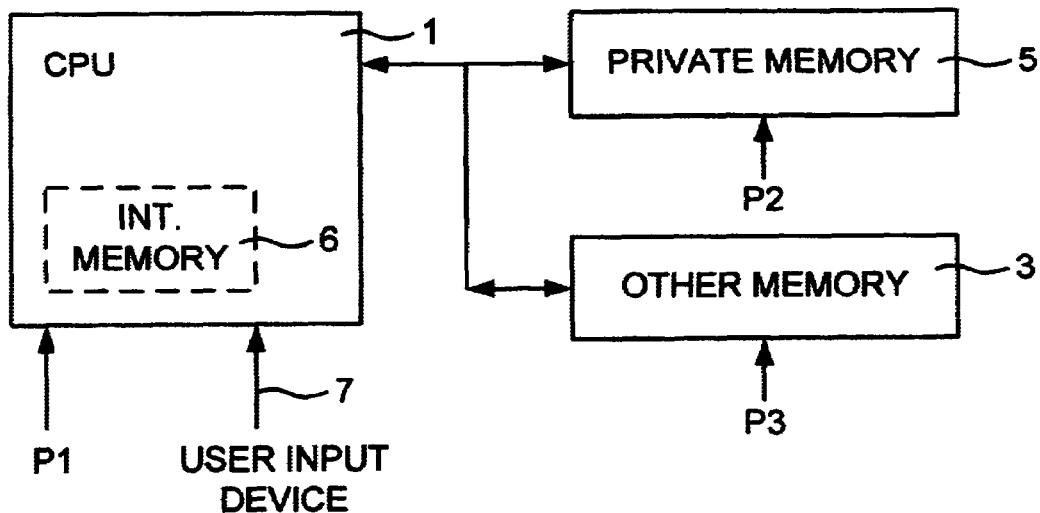
FIG. 1 is a high-level block diagram of one embodiment of a digital processor which incorporates the invention.

The invention is preferably implemented within the improved 992 Transmeta processor system earlier described, which implements software-enhanced execution (eg. dynamic translation), and is best explained in connection with that processor. The principal elements of that processing system as modified to incorporate the invention are symbolically illustrated in FIG. 1, to which reference is made. The processing system contains a computer processing unit ("CPU") 1, a memory 3 for the X86 program, the target machine code that the processor is to translate, its data, and a memory 5 with the private runtime support for the computer, the latter memory herein referred to as private memory. Memory 3 may encompass the entire memory hierarchy, including disk, RAM, $2^{nd}$ level cache and $1^{st}$ level cache. ROM memory, which is used by the processor, is considered as being separate from the processor, and for purposes of this description is not considered as part of the memory hierarchy of the processor. The foregoing illustration also excludes the memory that is regarded as internal to the CPU ("internal" memory).

The foregoing architecture is recognized as different from the traditional processor systems, such as the X86 system, which does not contain memory 5. As represented by the power arrows P1, the private memory 5 resides in a separate power domain than CPU 1 (and memory 3). Hence, electrical power to each component of the system may be separately and independently controlled, more specifically, CPU 1 may be powered down, while private memory 5 remains powered.

During processing operation, the Transmeta CPU 1 keeps track of its state or context. Since the Transmeta computer "virtualizes" the target processor, such as the X86 processor system, the computer must also keep track of the state of the X86 processor system, possibly including part of the chipset and the target (X86) application program for that processor, which is being translated and executed by the code morphing software. Hence, the context of the Transmeta processor constitutes a super-set of and subsumes the state of the X86 processor system.

The context of the Transmeta processing system is reflected in the contents of the general purpose registers, including core special registers ("CSR's"), peripheral special registers ("PSR's"), and the Northbridge registers, the D-cache, the I-cache, local program memory ("LPM"), and local data memory ("LDM"). Some of that context is stored in private memory 5. However, the internal context of CPU 1 is stored in internal memory, represented in the dotted block 6 within CPU 1.

The Transmeta computer includes a start up procedure to initialize and configure ("set up") the computer and begin processing, a procedure defined by software or in firmware, such as ROM code, which is included. That start-up procedure ("boot-up") is initiated once power to the computer is switched on to apply power (P1, P2, and P3) to both the CPU 1 and memories 3 and 5, a "boot-up" procedure referred to as "power-on reset".

Figure 2:
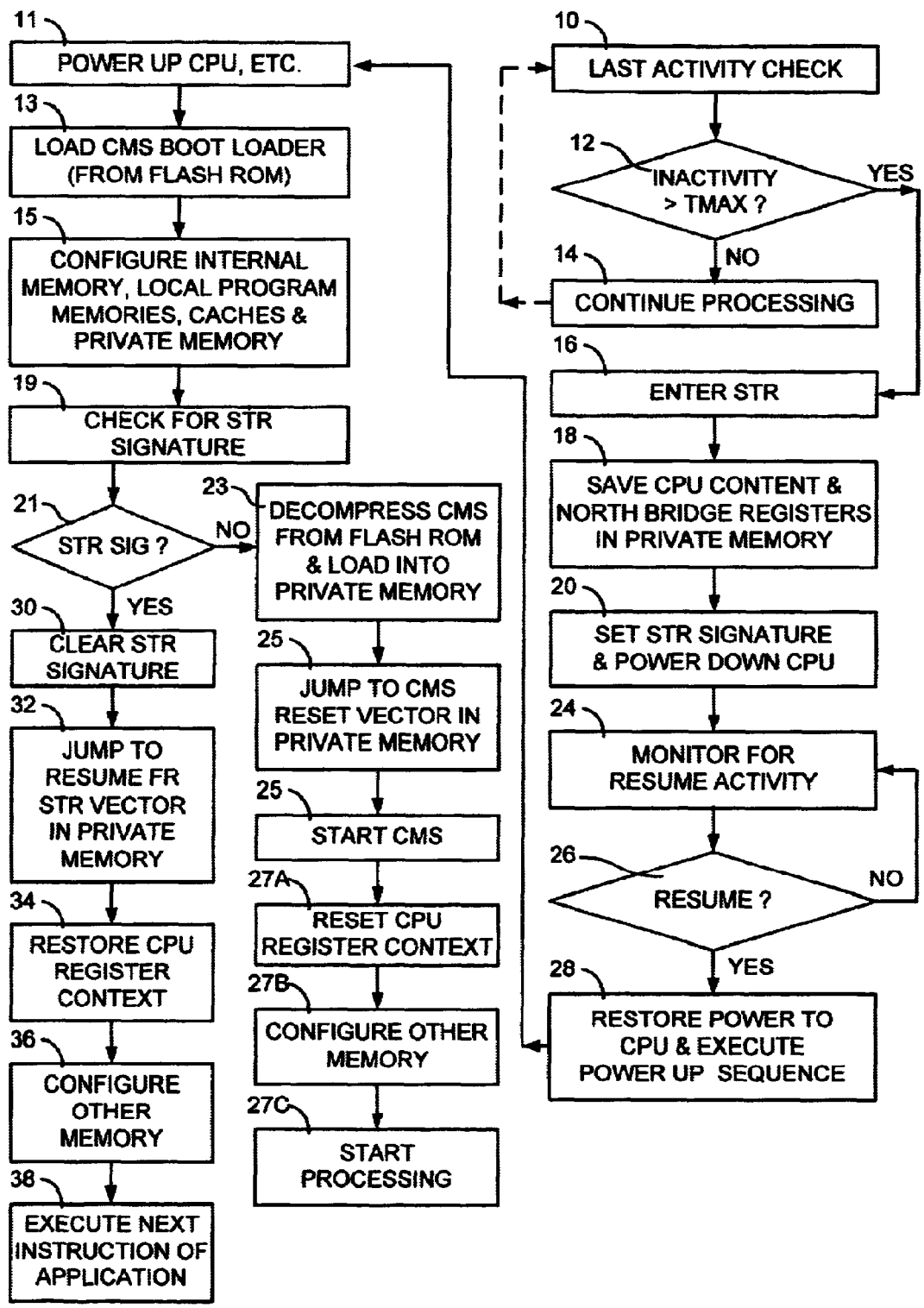
FIG. 2 is a flow chart defining the operation of the processor of FIG. 1.

The processor commences the start up procedure, as represented by operation 11 in FIG. 2 to which reference is made. Both the code morphing software and the CMS boot loader software of the Transmeta processing system are stored in compressed form in flash ROM (not illustrated) of the computer.

The CPU locates the CMS boot loader routine in the flash ROM and installs that routine in internal memory 6, as represented at block 13. As represented by operation 15, the CMS boot loader continues with configuring the cache, the private memory 5, and, possibly, the other memory.

At this juncture, and in accordance with the invention, the boot loader looks for an "STR signature", operation 19, which is later described herein in greater detail in connection with a Resume from STR condition. However, since the initial power on reset of the computer is presently being described, the STR signature is not present, and the decision at decisional block 21 is negative. A discussion of the operation that occurs when the STR signature is found is reserved to a later point in this description. The normal power on reset process continues, represented at operation 23, with the boot loader program requiring CPU 1 to locate the compressed CMS in the flash ROM, decompress the CMS and load that software in the private memory 5 where stored for use in processing. Depending upon the design of the computer, the program may also set up a debugging environment for the processor, prior to decompressing the code morphing software.

Once stored in private memory 5, the boot loader routine "jumps" into the code morphing software at its "reset" vector in private memory 5, as represented at block 25 and begins executing (e.g. starts) the CMS. On starting, the CMS resets the CPU registers and establishes the CPU context, as represented by block 27A, configures other memory, block 27B, and then commences normal processing, the details of which are not relevant or material to the present invention.

Continuing with right side of FIG. 2, during normal processor operation, which in accordance with the present invention includes the sleep mode, the power management sub-routine of the BIOS or operating system periodically checks for activity on the processor keyboard and other user input devices, and, as represented by block 10, checks to determine if instructions of an application program are being executed by the processor. The routine also records and stores the time of the last such activity and compares that time to the time of the present check to determine if the interval is greater than a predetermined time, Tmax, represented by decisional block 12. If not, the determination is negative and normal processing activity of the processor continues, as represented at block 14, including periodically repeating the activity check operation indicated by the dotted line to block 10.

Should the period of inactivity continue until the comparison determination results in an interval of greater than Tmax, a flag is set, represented by an affirmative decision at block 12. On finding that flag, the CPU program branches from the main routine to retrieve and execute the Instant STR routine, as represented at block 16.

An initial step in the Instant STR routine is to retrieve the part of the CPU context and Northbridge registers that is stored in the CPU's internal memory, and save that context in private memory 5. As represented at block 18, the foregoing state information is stored in the private memory along with the normal X86 execution state information, which the Transmeta processor normally saves in that memory.

Thereafter, the processor initiates the chipset to shut down power to CPU 1 (and other components of the processor), excepting the private memory 5, after a defined short time interval and sets the STR signature, as represented by operation 20. The chipset withdraws the power P1 to the CPU, which ceases operation at this point. Any information in the internal memories of the CPU disappears. Since private memory 5 remains powered up, that is, P2 (FIG. 1) continues, the entire context information is preserved. At this stage the CMS of the Transmeta processor is retained private memory 5.

While shutting down (i.e. before removing the power), CMS detects the Instant STR event and sets a corresponding flag (e.g. the "STR signature") in non-volatile memory. This enables the code morphing software to detect the Instant STR condition upon a power-on-reset, as later herein described. The foregoing flag may be implemented by writing the STR signature into private memory 5. Concurrently additional hardware, such as the Southbridge chip, serves to monitor the user input device 7 (FIG. 1) represented at block 24. If a negative determination is made, the checking continues as indicated at decisional block 26. If, however, any user activity is detected, such as the user's manipulation of any user input device 7, such as keyboard or mouse or the like, then an affirmative determination is made at decisional operation 26 and the computer initiates the operation, represented at block 28 to restore power to the CPU and execute the power up sequence. The latter operation returns the flow to operational block 11, which was earlier described.

The sequence of operation proceeds through the operations represented by operational blocks 13, 15 and 19, earlier described and not here repeated. When the boot loader checks for an STR signature this time as represented at block 19, an affirmative determination is made at decisional block 21. The processor clears the STR signature, 30, skips decompressing CMS as the software resides in the private memory, and, as represented in block 32 directly jumps into the CMS "resume from STR" routine vector in private memory 5. The CMS commences by restoring the internal CPU context and Northbridge registers from the private memory into the appropriate registers of the CPU as represented at operation 34 and configures other memory 36. With internal CPU context restored, all memories configured, and program state present in the private memory, the processor is restored to the state existing at the time of initiation of the sleep mode procedure at which juncture the processor may then retrieve the next instruction of the X86 target application for execution, as represented at block 38. As one appreciates, the foregoing method completes rapidly.

Figure 3:
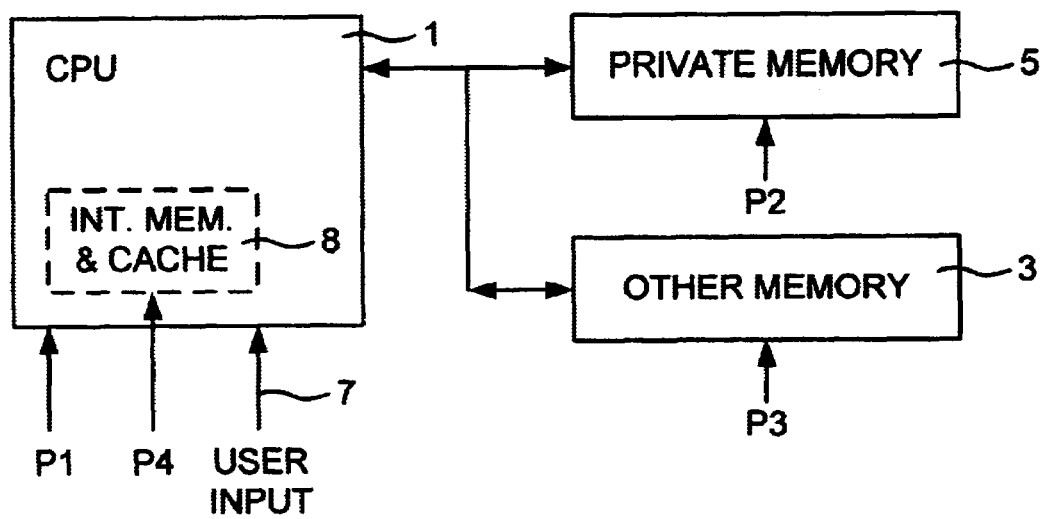
FIG. 3 is a high-level block diagram of another embodiment of a digital processor which incorporates the invention.

An alternative embodiment of the sleep mode invention would employ faster memory still, but would require modification to the structure of the Transmeta computer. Specifically, where it is practicable to modify the integrated circuit chip that contains the processor of the Transmeta computer so as to permit the on-chip caches to be powered up or down separately from the remaining elements of the processor, then it is possible to retain the internal context of the CPU within the processor during the sleep mode, avoiding the necessity for transferring the internal context to the private memory and back again during resume from the Instant STR procedure. Such a configuration is illustrated in FIG. 3, in which the internal memory and cache 8 are powered by power domain P4, separate from the power domain P1 of the other CPU elements. In as much as the memory employed for cache application is typically the fastest memory available, and the location is physically closer to the principal elements of the processor, propagation time is reduced. Further, the processing time to transfer the information is eliminated. In this embodiment, the memory serves both the function of cache and of the private memory found in the initial embodiment, earlier described.

The foregoing invention may be incorporated within target processing systems that currently employ a sleep mode, such as the X86 system, but requires some modification to the target system's operating software. Since a memory of the X86 system is already powered separately from the CPU of the processing system and for sleep mode operation that memory is already used to store the state of the operating system and the application program, an extra portion of that external memory may be used to also store the internal context of the X86 CPU.

Assume two levels of "sleep" for the X86 type computer: A first level in which the central processing unit (CPU) of the processor maintains the CPU context and a second level, more deep than the first, in which the context of the CPU is not maintained. In the first level, the Southbridge circuit of the processor shuts off (sic "kills") the input clocks to the CPU, but maintains power to the CPU. The BIOS and operating system ("OS") of the computer typically uses the first level or state a good deal of the time, because the state is low-overhead. In the second level, the Southbridge circuit kills the CPU input clocks, as before, and then also removes electrical power to the CPU and other devices of the processor. As a result of the removal of electrical power, the context information of the CPU state is lost. The BIOS and OS of the computer uses this second state less frequently than the first because the state is high overhead.

The present invention permits transparent power cycling of the CPU, turning the CPU off and then turning the CPU on, repeatedly at will, with low overhead (e.g. virtually maintaining the CPU context). Two embodiments of the invention are thus possible. The invention may replace the STR process found in the X86 processor system. In such an embodiment, the resume process restores the processor more quickly than the existing STR procedure although no savings is made in power consumption.

In a preferred embodiment, the invention replaces the CPU context-maintaining sleep state of the X86 system (e.g. "deep sleep" which is the deepest CPU context maintaining sleep mode) and the invention "tricks" the BIOS and/or OS to "think" that the CPU is placed in the sleep mode, deep sleep, when, in fact, once the BIOS and OS initiates the "deep sleep" action, all electrical power is removed from the CPU and the CPU enters the Instant STR condition. The advantage is that less power is consumed over time than when the CPU is placed in sleep mode. And with the benefit of the very rapid resume from STR action available with the invention the computer user never knows that the CPU had been turned off.

The foregoing second embodiment is possible of accomplishment in two different species. In the first specie of the preferred embodiment the code morphing software of the Transmeta processor intercepts the command issued by the operating system, such as Windows 9X, to shut down the CPU clock input to the CPU. Then the code morphing software issues a command to power down the CPU completely, that is, disable the CPU clock input and also remove electrical power from the CPU. Thus while the operating system "thinks" that the CPU remains powered, in fact, the CPU is completely powered down. In that sense the action is transparent to the X86 OS software and to the BIOS. In existing computers the context of the CPU is lost in this power saving mode. In the present invention the CPU context is saved in private memory 5.

The second species of the preferred embodiment requires the BIOS and/or the OS software to be modified to explicitly invoke an Instant STR operation. It may not be possible to accomplish this in computers that use a "closed" operating system, such as WINDOWS 9X, that can only be modified by the copyright owner, but can be readily accomplished in "open" operating systems, such as the familiar LINUX operating system. In new generations of BIOS and OS software, such a command may be easily incorporated, if timely suggested to the designers of such software.

By powering down the CPU additional power savings may be achieved when the computer is left idle. In the case of present CPU's operating at 600 MHz, the power saving is about sixty milliwatts. That savings would increase for computers in the future that contain future versions of CPU's containing process technology advances that typically allow higher operating frequencies, but result in greater power consumption in sleep mode.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. A method of reducing electrical power consumption by a digital computer when said digital computer is supplied with electrical power, but fails to process a computer application program for a prescribed period of inactivity, said digital computer including a host processor, said method comprising the computer implemented steps of:

said host processor producing and maintaining an internal context, said host processor containing code morphing software for dynamically translating and executing target applications designed for execution by a target processor, whereby said host processor creates a virtual target processor, said host processor maintaining data representing the state of said virtual target processor during processing of instructions of a target application and said internal context of said virtual target processor, said digital computer also including a private memory for storing at least the state of said virtual target processor and target application and said internal context of said virtual target processor;

determining if said prescribed period of inactivity has been attained, and, in response to an affirmative determination;

preserving said internal context of said virtual target processor against loss due to removal of electrical power from said host processor, said internal context of said virtual target processor preserved in said private memory, wherein said private memory is accessible only by said host processor and powered independently of said host processor;

producing a signature in response to said determining to indicate that said private memory contains information;

removing all electrical power from said host processor, whereby said host processor is powered down, notwithstanding continued supply of electrical power to said digital computer; and restoring electrical power to said host processor and restoring said preserved internal context of said virtual target processor to said host processor when processing is to resume.

2. The method defined in claim 1, wherein said step of preserving said internal context of said virtual target processor against loss due to removal of electrical power from said host processor, includes:

reading said internal context of said virtual target processor from the internal memory of said host processor prior to removal of electrical power from said host processor, said internal memory comprising internal registers; and writing said internal context of said virtual target processor into said private memory.

3. The method as defined in claim 1 wherein said host processor includes a cache memory; and wherein said step of preserving said internal context of said virtual target processor, includes:

supplying electrical power to said cache memory separately from said host processor, wherein removal of electrical power from said host processor leaves electrical power to said cache memory unaffected to prevent loss of said internal context of said host processor on removal of electrical power from said host processor.

4. The method as defined in claim 1, wherein the step of restoring electrical power to said host processor and restoring said preserved internal context of said virtual target processor to said host processor when processing is to resume, further comprises:

initializing said host processor;

determining whether application of electrical power was due to a power on reset condition or a resume from a suspend to RAM condition; and upon determining that electrical power commenced due to a resume from a suspend to RAM condition, then accessing and installing said preserved internal context of said virtual target processor to said host processor.

5. The method as defined in claim 1, wherein said step of restoring electrical power to said host processor and restoring said preserved internal context of said virtual target processor to said host processor when processing is to resume, further comprises:

initializing said host processor;

determining whether restoration of electrical power to said host processor is due to a power on reset condition or a resume from a suspend to RAM condition; and upon determining that electrical power commenced due to a resume from a suspend to RAM condition, then accessing said preserved internal context of said virtual target processor in said private memory and reading back said internal context of said virtual target processor into internal registers of said host processor for access by said host processor, whereby said internal context of said virtual target processor of said host processor is restored.

6. A processing system, comprising:

a central processing unit (CPU) for processing instructions of an application, said central processing unit including internal registers;

a first memory;

a second memory accessible only to said CPU;

a power supply for supplying power separately to said CPU and said first and second memories, wherein said CPU, said first memory and said second memory each reside in separate power domains;

said power supply including:

a rechargeable battery;

first power circuit means for distributing electrical power to said CPU;

second power circuit means for distributing electrical power to at least said first memory and said second memory; and an on-off switch for closing power from said battery to each of said first and second power circuit means, whereby said first and second power circuit means are enabled to deliver power;

first program routine means for detecting inactivity of application instruction processing of said CPU for a period of time, Tmax;

second program routine means for saving the internal context of said CPU in said second memory and for producing a signature in response to a positive detection of inactivity by said first program routine means, said signature indicating that said second memory contains information;

third program routine means for terminating distribution of power by said first power circuit means following completion of said second program routine means, whereby power is removed from said CPU while said internal context of said CPU is preserved in said second memory.

7. The processor as defined in claim 6, further comprising:

a user operated input device for enabling user input to said application;

means for enabling said second power circuit means to distribute power to said CPU, responsive to operation of said user operated input device;

program means responsive to re-energization of said CPU for initiating an initialization process for said CPU;

loading and processing a boot loader;

configuring internal memory of said CPU, excluding said second memory;

resetting registers of said CPU; and checking for said signature;

fourth routine program means, responsive to detection of said signature, for retrieving the portion of said internal context of said CPU earlier stored in said internal memory of said CPU and reading back said portion of said internal context of said CPU into the internal registers of said CPU, and retrieving said context of said Northbridge registers and loading said context of said Northbridge registers in said internal memory of said CPU.

8. The processor as define in claim 7, further comprising:

fifth routine program means for retrieving the next instruction of the application program for execution by said CPU, responsive to completion of said fourth routine program means.

9. A processing system, comprising:

a central processing unit for processing instructions, said central processing unit including internal registers;

a first memory;

a second memory accessible only to said central processing unit;

code morphing program means defining a virtual X86 processing system, said virtual X86 processing system including a virtual X86 central processing unit and a virtual Northbridge chip, whereby instructions of an X86 application may be processed in said processing system;

a power supply for supplying power separately to said CPU and said first and second memories, wherein said CPU, said first memory and said second memory each reside in separate power domains;

said power supply including:

a rechargeable battery;

first power circuit means for distributing electrical power to said CPU;

second power circuit means for distributing electrical power to at least said first and second memory; and an on-off switch for closing power from said battery to each of said first and second power circuit means, whereby said first and second power circuit means are enabled to deliver power;

first program routine means for detecting inactivity of application instruction processing of said CPU for a period of Tmax;

second program routine means for saving the entire internal context of said CPU in said second memory and for producing a signature in response to a positive detection of inactivity by said first program routine means, said signature indicating that said second memory contains information;

third program routine means for terminating distribution of power by said first power circuit means following completion of said second program routine means, whereby power is removed from said CPU and said CPU is placed in an off state while said internal context of said CPU is preserved in said second memory.

10. The processor as defined in claim 9, further comprising:

means for enabling said second power circuit mean distribute power to said CPU, responsive to operation of said user operated input device;

program means responsive to re-energization of said CPU for initiating an initialization process for said CPU;

loading and processing a boot loader;

configuring internal memory of said CPU, excluding said second memory;

resetting the registers of said CPU; and checking for said signature;

fourth program routine means, responsive to detection of said signature, for retrieving the portion of said internal context of said CPU earlier stored in one of said first and second memory and reading back said portion into the internal registers of said CPU, and retrieving said context of said Northbridge registers earlier stored in one of said first and second memory and loading said context in said internal registers of said CPU.

11. A digital computer comprising: a CPU; a private memory accessible only by said CPU; and a power supply, said power supply for supplying power to said CPU and said private memory independent of one another to enable withdrawal of power from said CPU without withdrawal of power from said private memory; said CPU defining and maintaining a CPU context to enable processing of application programs; said CPU containing code morphing software for dynamically translating and executing target applications designed for execution by a target processor, whereby said CPU creates a virtual target processor, said CPU maintaining data representing the state of said virtual target processor during processing of instructions of a target application and said internal context of said virtual target processor; said private memory for storing at least the state of said virtual target processor and said target application, said internal context of said virtual target processor and said CPU context, whereby said CPU context is retained upon withdrawal of power from said CPU without withdrawal of power from said private memory and wherein a flag is set to indicate that said private memory contains said CPU context.

12. A method of reducing power consumption of a digital computer during a sleep mode of operation, said digital computer including a power management program for placing said digital computer in multiple stages of sleep mode, said multiple stages of sleep comprising at least a pre-STR (suspend to RAM) stage and an STR stage, said method comprising:

determining whether a first instruction is issued said power management program for placing said digital computer in a pre-STR stage of sleep, said pre-STR stage comprising maintaining power to a processor of said digital computer;

intercepting said first instruction; and substituting for said first instruction a second instruction to place said digital computer in said STR stage of sleep, said STR stage comprising removing power from said processor, wherein entry to said STR stage occurs bypassing said pre-STR stage in response to said first instruction and transparent to said power management program.

13. The method of claim 12 further comprising:

writing internal context of said processor to a private memory accessible only by said processor and powered independently of said processor; and removing power from said processor.

14. A computer system comprising:

a processor;

a first memory accessible by said processor;

a second memory accessible only to said processor, wherein said second memory is internal to said processor, wherein power to said second memory is controlled separately from power to said processor and to said first memory, wherein power is maintained to said second memory when power is removed from said processor, said second memory for maintaining internal context of said processor when power is removed from said processor; and a third memory external to said processor and accessible only to said processor, wherein power to said third memory is controlled separately from power to said processor and to said first and second memories.

* * * * *